United States Patent [19]
Herring, Jr. et al.

[11] Patent Number: 5,271,686
[45] Date of Patent: Dec. 21, 1993

[54] ROBOT HAND FOR ALIGNING AND ISOLATING A WORK TOOL

[75] Inventors: James M. Herring, Jr., Rochester Hills; Donald J. Legowsky, Mt. Clemens, both of Mich.

[73] Assignee: The Budd Company, Troy, Mich.

[21] Appl. No.: 826,014

[22] Filed: Jan. 27, 1992

[51] Int. Cl.⁵ .............................. B25J 17/00
[52] U.S. Cl. ....................... 403/229; 901/29
[58] Field of Search ............ 403/13, 2, 229; 901/29, 901/49, 45

[56] References Cited

U.S. PATENT DOCUMENTS

| | | | |
|---|---|---|---|
| 3,824,674 | 7/1974 | Inoyama | 29/407 |
| 3,885,295 | 5/1975 | Engelberger | 29/429 |
| 3,984,006 | 10/1976 | Takeyasu | 214/1 BB |
| 4,179,783 | 12/1979 | Inoyama | 29/281.5 |
| 4,637,775 | 1/1987 | Kato | 414/744 R |
| 4,661,037 | 4/1987 | Sugino | 901/45 |
| 4,681,202 | 7/1987 | Dinse | 192/129 |
| 4,700,932 | 10/1987 | Katsuno | 267/136 |
| 4,797,564 | 1/1989 | Ramunas | 307/119 |
| 4,816,732 | 3/1989 | Wilson | 318/568 |
| 4,830,565 | 5/1989 | Bucher | 414/416 |
| 4,834,440 | 5/1989 | Kato | 294/86.4 |
| 4,872,718 | 10/1989 | Nerger | 901/49 X |
| 4,954,005 | 9/1990 | Knasel | 403/57 |

FOREIGN PATENT DOCUMENTS

| | | | |
|---|---|---|---|
| 236693 | 6/1986 | Fed. Rep. of Germany | 901/45 |
| 0053275 | 3/1984 | Japan . | |
| 0201731 | 11/1984 | Japan . | |
| 0227335 | 12/1984 | Japan . | |
| 0156625 | 6/1988 | Japan . | |
| 66583 | 3/1991 | Japan | 901/45 |

Primary Examiner—Randolph A. Reese
Assistant Examiner—Anthony Knight
Attorney, Agent, or Firm—Harness, Dickey & Pierce

[57] ABSTRACT

A robot hand adaptable to a robot arm for rigidly connecting a work tool to a robot arm while the work tool is positioned, but appropriately aligning and substantially isolating the work tool from the robot arm during the work tool's manufacturing operation.

12 Claims, 2 Drawing Sheets

ROBOT HAND FOR ALIGNING AND ISOLATING A WORK TOOL

BACKGROUND OF THE INVENTION

This invention relates to an industrial robot hand, and more particularly, to a robot hand useful for transporting a work tool to its appropriate position, aligning the work tool during operation and isolating a robot arm from the work tool during operation.

A major difficulty in using robots for manufacturing operations is that during the manufacturing process the work tool tends to change alignment depending on the tool operation and the work piece being operated on. The reaction forces created by this alignment change can be many times the force capacity of the robot arm. This reaction force can be sufficient to overdrive the robot control systems resulting in a robot failure if the work tool is rigidly connected to the robot arm. Additionally, significant forces resulting from the work tool operation, such as the reaction forces a riveting gun creates during the riveting operation, may also be sufficient to cause robot failure.

Accordingly, it is the primary aim of this invention to provide a means for rigidly connecting a work tool to the robot arm while the tool is being positioned, then allowing the work tool to appropriately align itself during the manufacturing operation without reacting the alignment forces through the robot arm.

Another object of this invention is to provide a means for isolating the work tool from the robot arm during the manufacturing operation, thereby preventing the feedback of additional forces generated during the manufacturing operation.

SUMMARY OF THE INVENTION

The present invention, in its preferred embodiment, is a robot hand comprising two major assemblies, an inner assembly and an outer assembly. The inner assembly is attached to the robot arm and includes a stalk with conical flanges axially located on the stalk. The outer assembly includes tapered seats which are capable of engaging the conical flanges of the stalk, and attachment plates for connecting a rivet gun. A set of springs disposed between the inner and outer assemblies urges the outer assembly away from the inner assembly such that the tapered seats of the outer assembly contact the conical flanges of the inner assembly, thereby providing a rigid connection between the robot arm and the rivet gun.

In operation, the robot arm manipulates the rivet gun to an appropriate location relative to a rivet in a work piece such as a vehicle frame. The robot arm continues to move down along the axis of the rivet thereby compressing the springs causing the conical flanges of the inner assembly to disengage the tapered seats of the outer assembly. The rivet gun, at this point, is supported between the robot arm through the springs and the rivet head. The springs allow the head to come into alignment with the rivet. Additional travel in the springs isolates the robot arm from the rivet gun during the riveting operation.

Upon completion of the riveting operation the robot arm manipulates the rivet gun away from the rivet causing the springs to extend. This movement urges the conical flanges of the inner assembly onto the tapered seats to positively position the outer assembly circumferentially with respect to the inner assembly and re-establishes a rigid connection between the robot arm and the rivet gun.

DESCRIPTION OF THE DRAWINGS

The various advantages and other features of this invention will become apparent to those skilled in the art upon reading the following specifications and by reference to the drawings in which.

DESCRIPTION OF THE PREFERRED EMBODIMENT

Figure 1:
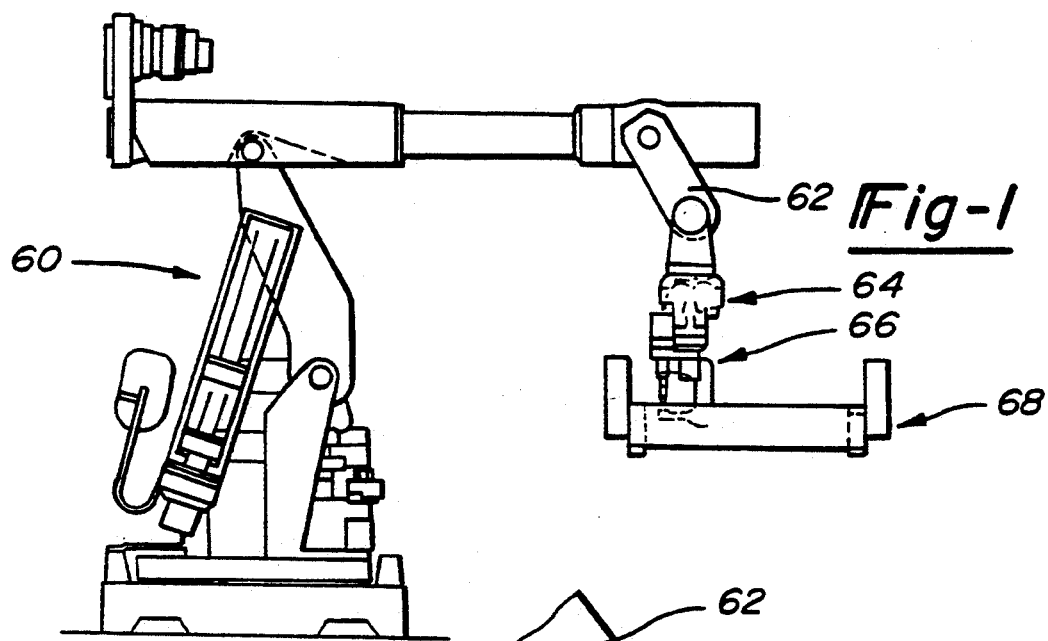
FIG. 1 is an elevation view of the robot system with the robot hand and rivet gun incorporated.

With reference to FIG. 1, a robot 60 includes a robot hand 64 located on the end of a robot arm 62. Rivet gun 66 is mounted on robot hand 64 to enable robot 60 to manipulate rivet gun 66 relative to work piece 68.

Figure 2:
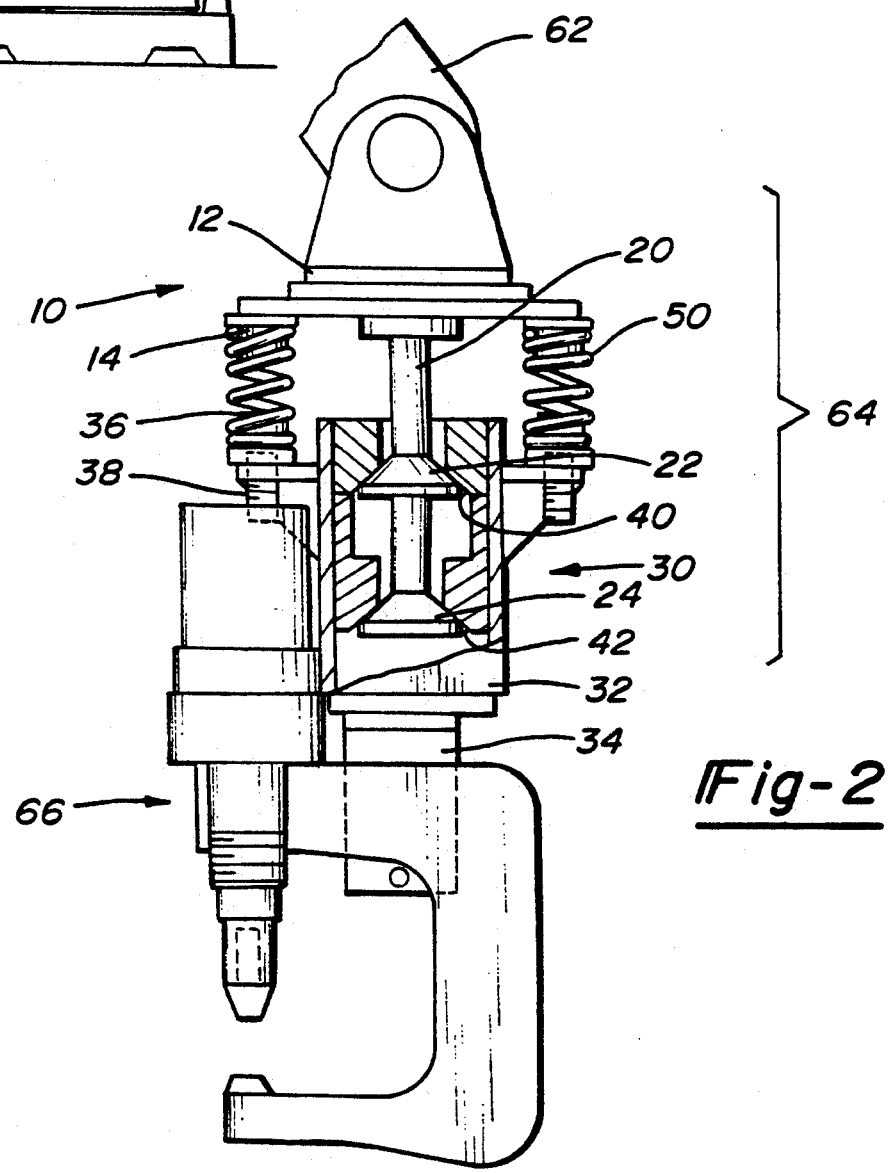
FIG. 2 is a side view of the robot hand and rivet gun in the rigidly connected position.

With reference now to FIG. 2, an enlarged detail of robot hand 64 shows inner assembly 10 attached to robot arm 62 and outer assembly 30 attached to rivet gun 66. Four upper spring seats 14 are equally spaced on robot arm mounting plate 12. Stalk 20 including upper conical flange 22 and lower conical flange 24 located axially on the stalk is centrally attached to robot arm mounting plate 12.

Outer assembly 30 includes upper tapered seat 40 and lower tapered seat 42 positioned in outer tube 32 such that stalk 20 of inner assembly 10 is substantially enclosed and encircled by upper tapered seat 40 and lower tapered seat 42. Work tool attaching plate 34 connects outer tube 32 with rivet gun 66. Four lower spring seats 36 are spaced identical to upper spring seats 14 and are threadedly attached to outer assembly 30 by threaded spring tensioners 38.

Outer assembly 30 is free to reciprocate along and tilt relative to the axis of stalk 20. Movement of outer assembly 30 away from inner assembly 10 is restricted when conical flanges 22 and 24 engage tapered seats 40 and 42, thereby circumferentially positioning outer assembly 30 relative to inner assembly 10. Coiled springs 50 are disposed between upper spring seat 14 and lower spring seat 36 to generate a repelling force between inner assembly 10 and outer assembly 30, thereby urging tapered seats 40 and 42 onto conical flanges 22 and 24 to temporarily provide a rigid connection between inner assembly 10 and outer assembly 20. Spring tensioners 38 threadedly position lower spring seats 36, thereby adjusting the preload in coil springs 50.

Figure 3:
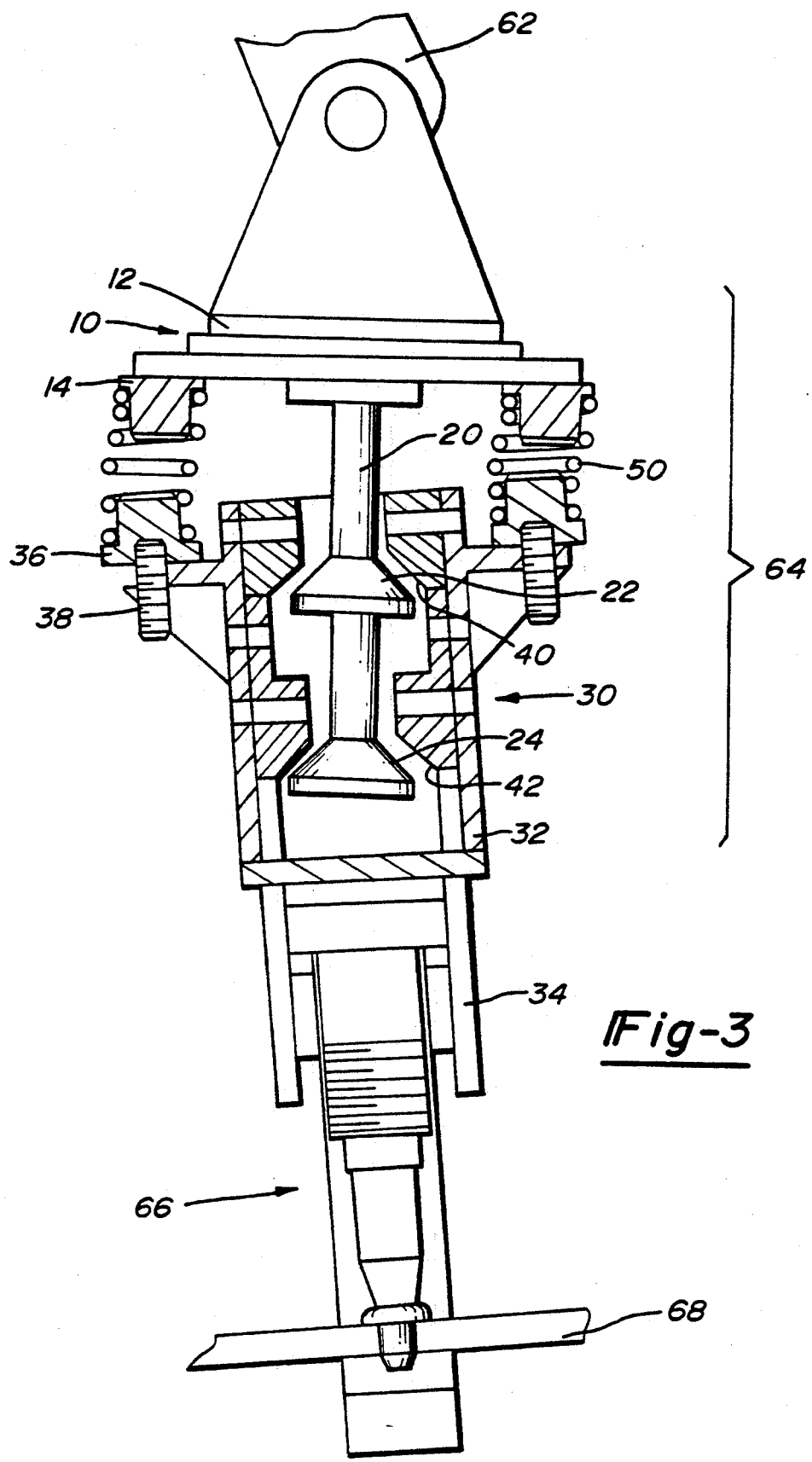
FIG. 3 is an end view of the robot hand and rivet gun in the isolated position.

With reference now to FIG. 3, robot arm 62 manipulates robot hand 64 appropriately to work piece 68. Outer assembly 30 tilts to align rivet gun 66 perpendicularly with work piece 68. Robot arm 62 positions rivet gun 66 to compress coiled springs 50 causing conical flanges 22 and 24 to unseat from tapered seats 40 and 42. This allows outer assembly 30 to align perpendicularly with work piece 68 and coiled springs 50 to isolate rivet gun 66 from robot arm 62. Rivet gun 66 is now appropriately aligned and substantially isolated from the robot arm 62 to perform its manufacturing operation.

Upon completion of the manufacturing operation, robot arm 62 begins to manipulate rivet gun 66 for the next manufacturing operation, thereby releasing coiled springs 50. Outer assembly 30 is urged away from inner assembly 10 by coiled springs 50. Conical flanges 22 and 24 engage tapered seats 40 and 42 to positively position outer assembly 30 circumferentially with respect to inner assembly 10. A rigid connection is reestablished between robot arm 62 and rivet gun 66 when outer assembly 30 is fully seated on stalk 20. Robot 60 can now manipulate rivet gun 66 for the next manufacturing operation.

While the above detailed description describes the preferred embodiment of the present invention as a robot hand capable of appropriately aligning and substantially isolating a work tool from a robot arm, it is understood that the present invention is susceptible to modification, variation, and alteration without deviating from the scope and fair meaning of the subjoined claims.

What we claim is:

1. An apparatus for mounting a work tool and connecting said work tool to a robot arm, said apparatus comprising:
    an inner assembly for attaching said apparatus to said robot arm;
    an outer assembly for fixably mounting said work tool to said outer assembly;
    positioning means for positioning said outer assembly relative to said inner assembly, said positioning means being attached to said inner assembly and having a central longitudinal axis;
    spring means including a plurality of springs each having a central longitudinal axis located outboard of the central longitudinal axis of said positioning means and disposed between the inner assembly and the outer assembly for during said inner assembly away from said outer assembly; and
    wherein said spring means cooperates with the inner assembly and the outer assembly to provide at least three degrees of movement therebetween.

2. The apparatus according to claim 1 wherein said positioning means comprises:
    a stalk attached to said inner assembly having a central longitudinal axis and a conical flange axially located thereon; and
    a tapered seat located on said outer assembly enveloping said conical flange therein.

3. The apparatus according to claim 1 wherein said spring means further comprises:
    a plurality of upper spring seats attached to said inner assembly;
    a plurality of lower spring attached to said outer assembly; and
    a plurality of coiled springs disposed between said upper spring seats and said lower spring seats.

4. The apparatus according to claim 3, wherein said lower spring seats are threadedly attached to said outer assembly such that adjustably positioning said lower spring seats varies a preload in said coiled springs.

5. A robot hand in which a rivet gun is mounted to a robot arm, said robot hand comprising:
    an inner assembly having a mounting plate for attaching said robot hand to said robot arm, four upper spring seats equally spaced on said mounting plate and a stalk centrally attached to said mounting plate, said stalk having a central longitudinal axis and two conical flanges axially located thereon;
    an outer assembly having an outer tube two tapered seats located within said outer tube such that each tapered seat envelope said conical flange, four lower spring seats associated with said four upper spring seats, said four lower spring seats threadedly attached to said outer assembly, said outer assembly further having a work tool mounting plate for attaching said rivet gun to said outer tube;
    spring means having four coiled springs disposed between said upper spring seats and said lower spring seats for urging said inner assembly away from said outer assembly, each of said coiled springs having a central longitudinal axis located outboard of the central longitudinal axis of said stalk; and
    wherein said spring means cooperates with said inner assembly and said outer assembly to provide at least three degrees of movement therebetween.

6. An apparatus for mounting a work tool and connecting said work tool to a robot arm, said apparatus comprising:
    an inner assembly for attaching said apparatus to said robot arm;
    positioning means for positioning said inner assembly relative to an outer assembly, said positioning means being attached to said inner assembly, having a central longitudinal axis and having a conical flange axially located thereon;
    said outer assembly being attached to said work tool and having a tapered seat enveloping said conical flange therein; and
    spring means including a plurality of springs having a central longitudinal axis located outboard of the central longitudinal axis of said positioning means and disposed between the inner assembly and the outer assembly for cooperating with the inner assembly and outer assembly to provide at least three degrees of movement therebetween, thereby substantially isolating the robot arm from the work tool when said work tool is engaged with the work piece and urging said conical flange onto the tapered seat when said work tool is disengaged from said work place.

7. The apparatus according to claim 6 wherein said apparatus further comprises adjustment means for independently adjusting a preload in each of said plurality of springs.

8. An apparatus for mounting a work tool and connecting said work tool to a moveable arm, said apparatus comprising:
    an inner assembly for attaching said apparatus to said arm;
    an outer assembly for fixably mounting said work tool;
    positioning means attached to said inner assembly for positioning said outer assembly relative to said inner assembly;
    spring means including a plurality of springs disposed between the inner assembly and the outer assembly for urging, said inner assembly away from said outer assembly, each of said plurality of springs having a preload; and
    adjustment means for independently adjusting the preload in each of said plurality of springs.

9. The apparatus according to claim 8 wherein said spring means cooperates with the inner assembly and the outer assembly to provide at least three degrees of movement therebetween.

10. The apparatus according to claim 8 wherein said spring means further comprises a plurality of coiled springs, each spring having a central longitudinal axis located outboard of a central longitudinal axis of said positioning means.

11. The apparatus according to claim 8 wherein said adjustment means further comprises:
   a plurality of upper spring seats attached to said inner assembly;
   a plurality of lower spring seats adjustably attached to said outer assembly;
   said plurality of springs disposed between said upper spring seats and said lower spring seats; and
   wherein adjustably positioning each of said plurality of lower spring seats varies the preload in each of said plurality of springs associated therewith.

12. The apparatus according to claim 11 wherein said plurality of lower spring seats are threadedly attached to said outer assembly.

* * * * *